INVENTOR.
TOKUZO INARIBA

United States Patent Office 3,348,083
Patented Oct. 17, 1967

3,348,083
MINIATURE ELECTRIC SYNCHRONOUS MOTOR
Tokuzo Inariba, Kata-Machi, Nishikasugai-gun, Aichi Prefecture, Japan, assignor to Kabushiki-Kaisha Tokai Rika Denki Seisakusho, Nishikasugai-gun, Aichi Prefecture, Japan
Filed Oct. 6, 1964, Ser. No. 401,804
Claims priority, application Japan, Oct. 10, 1963, 38/54,124; Sept. 19, 1964, 39/53,797, 39/53,798
6 Claims. (Cl. 310—164)

The present invention relates to a miniature electric synchronous motor.

More particularly, it relates to a novel self-starting electric synchronous motor comprising an exciting coil, a permanent magnet which serves as a stator, a rotor having pole teeth so shaped as to be able to distribute effectively the magnetic flux of an alternating magnetic field, caused by said exciting coil, over the cylindrical surface of said permanent magnet, and a salient pole ring fixed in the alternating magnetic circuit and facing said pole teeth.

It is true that, so far various kinds of self-starting electric synchronous motors have been developed. But, unless they are equipped with a special starting mechanism, can hardly start unless they come up to synchronized velocity within half a cycle of the frequency of an alternating current supply after being switched on. Therefore, it has been a major problem to obtain a high starting efficiency. These motors have, in common disadvantages of small output torque, poor efficiency, high temperature rise, unduly large mass or bulk and very expensive construction. In these electric synchronous motors, those structures in which a permanent magnet is used as a rotor are common, these have serious deficiencies in their starting efficiency especially in motors of the compact type, since the permanent magnet, which serves as a rotor, is made of a ferromagnetic material, such as ferrite, and consequently has a large mass and comparatively larger moment of inertia.

With the invention and development of transistors, there has been a consistent trend toward miniaturization of electrical devices and circuits to the largest extent possible without loss in efficiency. This miniaturization trend has brought a demand for miniature electric synchronous motors having acceptable torque without an excessive temperature rise. To meet these requirements, a miniaturized electric synchronous motor requires a rotor which, with a magnetic field that has become inevitably weaker due to the decrease in size of the motor, has a comparatively small moment of inertia and is also well balanced in its magnetic and mechanical relation with the remainder of the motor. However, conventional synchronous motors in which a permanent magnet is used as a rotor can hardly meet the above requirements, because the rotor can not be made sufficiently small because of its magnetic characteric, mechanical intensity, and the difficulties in its precise machining.

In accordance with the present invention, a synchronous electric motor is provided which has a high self-starting efficiency and an acceptable torque, thus avoiding the disadvantages of synchronous electric motors of the prior art. The synchronous electric motor of the invention is characterized by several novel features. Thus, a permanent magnet having a large mass and a large moment of inertia is used as a stationary element of the motor, rather than as the rotor thereof. Associated with this permanent magnet is a pole piece or rotor forming part of an alternating magnetic circuit for an alternating magnetic flux developed by an exciting winding energized from an A.C. source. The pole piece or rotor has pole teeth which are uniformly angularly spaced therearound and which are triangular in that each pole tooth converges to a point at its free end. By virtue of the triangular shape of the pole teeth, the alternating magnetic flux emanating from the exciting winding is evenly distributed over the cylindrical surface of the permanent magnet.

The permanent magnet is magnetized so as to have north and south poles alternating around its periphery and uniformly angularly spaced from each other. The number of poles of the permanent magnet is twice the number of the pole teeth of the pole piece or rotor so that, when the exciting winding is de-energized, each pole tooth of the pole piece or rotor will lie between the two poles, of opposite polarity, of a respective pair of poles of the cylindrical permanent magnet or stator.

A salient pole ring is included in the alternating magnetic circuit in facing relation with the pole teeth of the rotor, and serves to concentrate or converge the magnetic flux around the cylindrical surface of the permanent magnet for effective interlinkage of the alternating magnetic field with the direct magnetic field of the permanent magnet.

In the accompanying drawings which illustrate preferable embodiments of the present invention:

Figure 3:
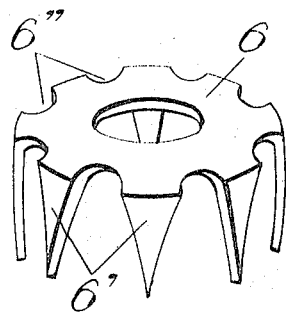
Figure 4:
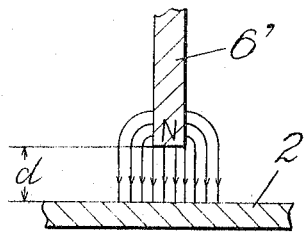
Figure 5:
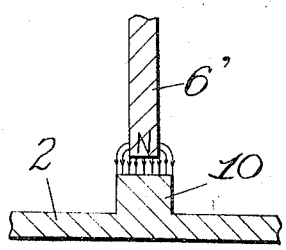
Figure 6:
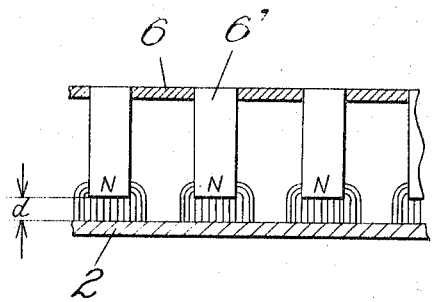
Figure 7:
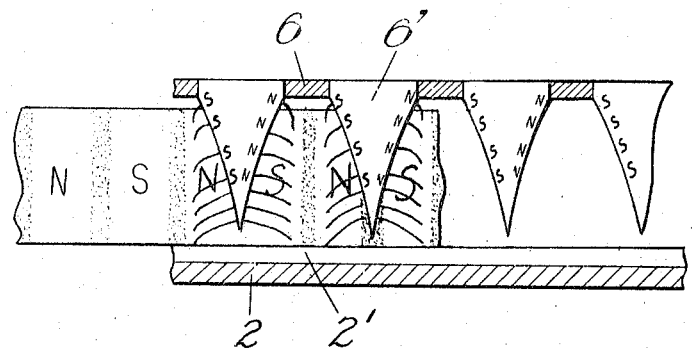
Figure 8:
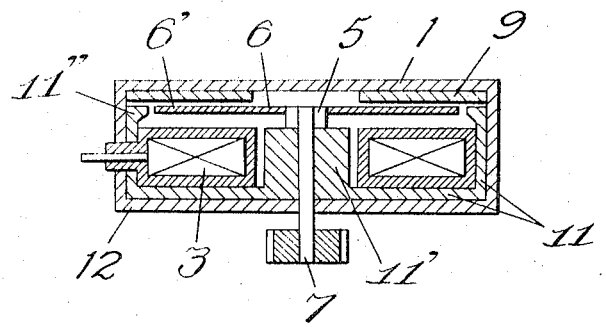

FIG. 3 is a perspective view of a rotor, especially illustrating its pole piece, FIG. 4 is an explanatory vertical section showing the distribution of alternating magnetic flux emanating from the pole teeth of a rotor in a synchronous electric motor which is not provided with a salient pole ring, FIG. 5 is a view, similar to FIG. 4, but showing the conditions with respect to the motor of the invention which is provided with a salient pole ring, FIG. 6 is an explanatory development view showing the distribution of alternating magnetic flux around pole teeth of conventional motors, FIG. 7 is an explanatory development view showing the distribution of alternating magnetic flux around the pole teeth of a motor of the present invention, and FIG. 8 is an explanatory vertical section showing another embodiment of the present invention.

Figure 1:
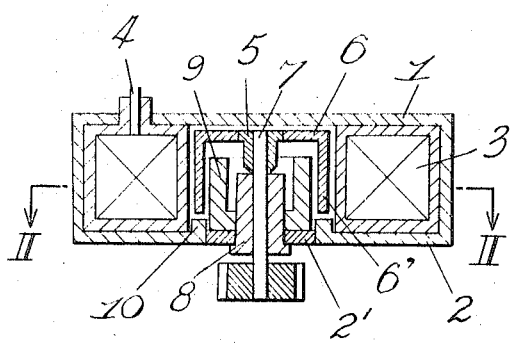
FIG. 1 is an explanatory vertical section of a motor of the present invention.
Figure 2:
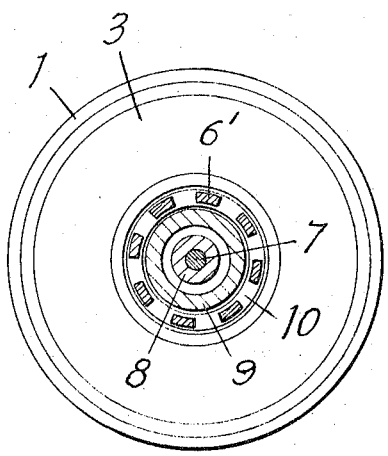
FIG. 2 is a cross section taken along the line II—II of FIG. 1.

With reference to FIGS. 1 and 2, a motor casing 1, made of soft magnetic material and which serves as a part of an alternating magnetic circuit, has a base 2 of soft magnetic material with relatively high magnetic permeability, an annular toroidal exciting coil or winding 3 being fixed to said casing and having a terminal 4 for connection to an alternating curent source.

The D.C. magnetic field of the motor is provided by a cylindrical permanent magnet 9, of barium-ferrite, fixedly mounted on a portion 2', of non-magnetic material, positioned centrally of annular base plate 2. Permanent magnet 9 has sixteen magnetic poles around its cylindrical periphery, these sixteen magnetic poles alternating in polarity, with there being eight north poles alternating with eight south poles. The poles are spaced at equal angular distances around the cylindrical periphery of permanent magnet 9, and face toward the inner periphery of exciting winding 3.

The rotor of the motor comprises a rotary pole piece 6, of magnetic material, having eight pole teeth 6' arranged around its periphery at equal angular spacings. In the embodiment of the invention shown in FIGS. 1, 2 and 3, teeth 6' are bent, at their bases, to extend substantially perpendicularly to the diametric plane of rotor 6. In contrast to the pole teeth of prior art motors, pole teeth 6' are triangular in shape, tapering toward their free ends which are formed as sharp-pointed ends. Furthermore, for a purpose to be described, breaks or indentations 6'' are formed in rotor 6 between the bases of adjacent teeth 6'. The pole teeth 6' extend axially into the space between the cylindrical periphery of permanent magnet 9 and the inner periphery of exciting winding 3, these two peripheries being radially spaced to provide a cylindrical gap therebetween.

It will be appreciated that, inasmuch as all of the pole teeth 6' are integral with the magnetic rotor 6, all of the pole teeth have the same instantaneous polarity when exciting winding 3 is energized, this instantaneous polarity changing from north to south, and vice versa, at a frequency which is equal to twice the frequency of the A.C. potential applied to exciting winding 3. Rotor or rotary pole piece 6 is fixed on a rotor shaft 7 through the medium of a plastic nipple or boss 5 fixedly centered in the central opening of rotor 6. Shaft 7 extends through a bearing 8 which is centered through cylindrical permanent magnet 9, and an output pinion or gear may be secured on the outer end of shaft 7, as illustrated in FIG. 1. The previously mentioned salient pole ring is indicated at 10, as provided on or integral with base plate 2 and in aligned facing spaced relation to the pointed ends of pole teeth 6'.

The following is an explanation of how a motor of the present invention works:

The alternating magnetic flux developed by exciting coil or winding 3 is effective on the pole piece 6, so that all of the pole teeth 6' have the same instantaneous polarity. The path of the alternating magnetic flux extends from exciting winding 3 into rotor 6, through pole teeth 6', into salient pole ring 10, through base 2, and back into exciting winding 3. The flux at the gap between the pointed ends of pole teeth 6' and salient pole ring 10 is concentrated into the salient pole ring 10 rather than being diffused over the base plate 2. The direct magnetic flux path extends from one peripheral pole of permanent magnet 9 into a pole tooth 6' and back into the next adjacent peripheral pole which has a polarity opposite to that of the first mentioned peripheral pole. Consequently, when exciting winding 3 is de-energized, each pole tooth 6' of rotor 6 remains circumferentially centered between a respective pair of adjacent poles on the periphery of permanent magnet 9, the two poles of each respective pair being of respective opposite polarity. This is due to the fact that the two poles of each pair of poles, one north and one south pole, on the periphery of permanent magnet 9, exert an equal and opposite magnetic influence on a respective pole tooth 6' when the exciting winding 3 is de-energized. This equal and opposite magnetic influence on a respective pole tooth 6' is also exerted at the moment, during each cycle of A.C. energization, when the A.C. magnetic flux passes through the zero value. When an A.C. potential is applied to exciting winding 3 through the terminal 4, all the pole teeth 6' are magnetized to the instantaneous polarity which alternates between north or south, synchronizing with the frequency of the alternating current source.

Thus, on application of an A.C. potential to exciting winding 3, all the teeth 6' assume an instantaneous polarity such that each tooth is attracted by the north pole of the associated pair of permanent magnet poles, for example, and repulsed by the south pole of the associated respective pair of permanent magnet poles. In the next half cycle of alternating current, the instantaneous polarity of all of the teeth 6' is reversed. Thus, the rotor 6 is caused to rotate in synchronism with the frequency of the A.C. source.

Known synchronous electric motors cannot start unless their rotors can be accelerated to synchronism within $T/2$ (T is a cycle of an alternating current), whether a rotor has too large moment of inertia, or the magnetomotive force of the magnetic circuit is small. However, conventional synchronous electric motors have, in common, the difficulty of obtaining a rotor having a sufficiently small moment of inertia for effective cooperation with a magnetic field which is inevitably weakened due to the small size of the motor. This is due to the fact that the rotors of conventional synchronous electric motors are permanent magnets made of a ferromagnetic material, such as ferrite, and consequently having a large mass and a comparatively large moment of inertia.

By contrast, the present invention provides a reliable synchronous motor, in which the self-starting efficiency is greatly improved due to the use of a rotor which has a comparatively small moment of inertia fully compatible for effective coaction with a weak magnetic circuit of a small-sized motor, and which is well-balanced in its magnetic and mechanical relations. This is accomplished by using a relatively light pole piece as a rotor and by providing a stationary or fixed permanent magnet.

The second major characteristics of a motor of the present invention is that, in the alternating magnetic circuit, a salient pole ring is provided facing the free ends of pole teeth of the rotary pole piece.

In conventional electric synchronous motors without any salient pole ring facing the free ends of pole teeth, the distribution of alternating magnetic flux on both sides of pole teeth, in an alternating magnetic circuit, is such that the density of magnetic flux in an axial section along the shaft is decreased, and the amount of alternating magnetic flux interlinking with the direct magnetic field of a permanent magnet is decreased. This is due to leakage of magnetic lines of force from the ends of pole teeth, as illustrated in FIG. 4.

By constrast, in a motor of the present invention, as illustrated in FIG. 5, the torque and efficiency are remarkably improved, by converging or concentrating the alternating magnetic flux, leaking from pole teeth, in the gap between the pole teeth and the salient pole ring, thus increasing density of magnetic flux. This makes the annular alternating magnetic field more effective and increases its interlinkage with the direct magnetic field of the permanent magnet.

The third major characteristic of a motor of the present invention is the sharp-pointed pole teeth 6' of the rotary pole piece or rotor 6.

In conventional synchronous motors, the magnetic pole piece generally comprises a plurality of substantially rectangular pole teeth arranged at uniform angular spacings annularly of a base member. However, and as illustrated in FIG. 6, the distribution of the magnetic flux passing from these pole teeth through a magnetic gap is such that the alternating magnetic field surrounding the permanent magnet becomes uneven. Thus, the magnetic lines of force tend to be largely concentrated immediately adjacent the free ends of the rectangular strip-like pole teeth, and very few magnetic lines of force extend from any other part of a pole tooth other than the part immediately adjacent its free end. Consequently, the torque developed by the rotor pulsates, and smooth rotation of the rotor cannot be obtained. Especially in the case of miniature electric motors with very small moments of inertia of the rotor, the above-mentioned factors cause a decrease in their torque.

Another disadvantage of pole pieces including substantially rectangular teeth is that, since the alternating magnetic flux generated by an exciting winding interlinks with only a small part of the direct magnetic field developed by a permanent magnet, with the alternating magnetic flux thus interlinking being only a small portion near the free ends of the pole teeth, the efficiency of the motors becomes poor because of poor utilization of the direct magnetic field. In other words, when the interlinkage zone between the direct magnetic flux and the alternating magnetic flux is increased by enlarging an air gap distance $d$ between a base plate and the free ends of rectangular pole teeth, as shown in FIG. 6, the resistance of the air gap in the alternating magnetic circuit increases and thus the alternating magnetic flux decreases in value. On the other hand, if the resistance of the magnetic air gap is decreased by making the air gap shorter, the interlinkage zone decreases. By taking into consideration these two factors, the distance $d$, representing the width of the air gap, can be selected to obtain a maximum interlinkage between the alternating and direct magnetic fluxes. From the results of experiments, the distance $d$ providing a maximum of such interlinkage is determined to be from 1/5 to 1/4 of the height or length of a permanent magnet. Consequently, the actual magnetic flux available to exert a torque in an electric motor is only a small portion of the entire magnetic flux of a permanent magnet.

In the motor of the present invention, the pole teeth taper in width toward their free ends so that the magnetic resistance increases toward these free ends. Linkage magnetic lines of force appear not only at the free ends of the pole teeth, but also at the bases of the pole teeth. All of the pole teeth are magnetized alternately to the same instantaneous polarity, north or south, by the exciting winding. Thus, the alternating magnetic flux becomes a linkage magnetic flux distributed evenly over the entire cylindrical surface of the permanent magnet, due to the magnetic lines extending not only from the portion of each pole tooth adjacent its free end but also from the entire edge surfaces of the pole teeth. By virtue of this even distribution, the alternating magnetic flux can effectively interlink with the direct magnetic flux in an efficient manner, provided the pole piece is made of any material having a sharp magnetic saturation characteristic and a proper thickness, shape and dimensions.

FIG. 7 is an explanatory view illustrating the distribution of the magnetic flux over the edge surfaces of the pole teeth at the instant the excitation current is zero, rather than being concentrated at the free ends of the pole teeth. Upon magnetization of the pole teeth to one instantaneous polarity, the attraction of the pole teeth to one pole of each associated pair of magnetic poles of permanent magnet 9, and the repulsion between each pole tooth and the other pole, of opposite polarity, of the associated pair of permanent magnet poles, occur at opposite edges of each pole tooth. Thus, and referring to FIG. 7, if all of the pole teeth are magnetized with an instantaneous south polarity, each of the pole teeth will move toward the north pole of the associated pair of permanent magnet poles, and will be repulsed by the south pole of associated pair of permanent magnet poles. Immediately thereafter, the instantaneous polarity of all of the pole teeth is reversed to north, so that the movement will continue toward the next adjacent south pole to the left of the associated north pole, of the permanent magnet, as viewed in FIG. 7. Thus, there is no confusion or oscillation between attraction and repulsion, and thereby there is no mutual demagnetization between the pole teeth.

Correspondingly, since the moment of inertia of the rotor can be greatly reduced by decreasing the mass of the rotor due to its pole teeth being tapered toward their free ends, the self-starting and rotary efficiencies of the invention motor are greatly improved. This further increases the advantages of the invention motor over those of the prior art. The breaks or cutouts 6" between adjacent pole teeth, in the rotor 6, reduce eddy currents which might be produced in rotor 6.

The synchronous motor of the present invention having the above-mentioned novel constructions has shown excellent self-starting and rotary efficiencies, as listed in the following table, when it was compared with conventional synchronous motors of the same type in which a permanent magnet was used as a rotor rather than being stationary.

|  | (A) A conventional synchronous motor comprising a rotor made of a permanent magnet and a stator having rectangular strip-shaped pole pieces, and not provided with a salient pole ring. | (B) A synchronous motor of the present invention. |
|---|---|---|
| 1. Weight of rotor | 6.27 g | 3.20 g. |
| 2. Starting voltage (60 c./s.) | 105 v | 42 v. |
| 3. Starting ampere-turns | 144 AT | 40 AT. |
| 4. Output torque (1 r.p.m.–100 v., 60 c./s.) | 2.8 kg. cm | 4 kg. cm. |

In FIG. 8, showing an alternative embodiment of the invention, the motor includes a case 1 of non-magnetic material and a fixed and stationary flat annular permanent magnet 9 of a ferro-magnetic material, such as ferrite. Magnet 9 has 32 poles magnetized, alternately, with north polarity and south polarity, and arranged at uniform angular spacings around its periphery to extend radially of the flat surface thereof. The motor includes an E-shaped yoke 11 of soft magnetic material which lies on its side and is secured to case 1 so as to have its legs face toward magnet 9. The yoke 11 is an annular yoke, with an E-shape in diametric cross section, and includes an annular groove centered on the raised central part 11' serving as a bearing for output shaft 7. This annular groove receives an annular or toroidal exciting winding 3 arranged to have an A.C. potential applied thereto. The upper edge, as viewed in FIG. 8, of the annular rim of yoke 11 has a radially inwardly extending rib serving as a salient pole ring 11'', and the lower surface of the flat annular permanent magnet 9 is spaced from salient pole 11'' by a short distance. The lower surface of annular permanent magnet 9 is also spaced from exciting winding 3 and from the upper end, as viewed in FIG. 8, of the central boss 11' of yoke 11 by a somewhat greater distance.

In this embodiment of the invention, the rotor is a flat rotary pole piece 6 having 16 pole teeth 6' extending radially outwardly. Each of the pole teeth 6' is tapered to a sharp point at its free end. The pointed free ends of pole teeth 6' face, and are aligned with, salient pole ring 11'', there being an annular air gap between the free ends of teeth 6' and the salient pole ring 11''. Rotary pole piece 6 is fixed to the end of shaft 7 through the medium of a plastic boss 5 fitted in central raised part 11' of yoke 11. Numeral 12 is a plastic cover.

While the present invention has been explained to the full extent with reference to the preferably embodiments illustrated in the accompanying drawings, it is to be noted that various modifications and changes may be made within the spirit of the present invention as defined in the appended claims.

What is claimed is:

1. A miniature synchronous electric motor comprising, in combination, a casing; a bearing carried by said casing; a shaft rotatable in said bearing and having an inner end within said casing, and an outer end; a stationary circular cross section annular permanent magnet fixed non-rotatable within said casing and concentric with said shaft, said permanent magnet being magnetized radially to provide north and south poles alternating therearound at equal angular spacings; an annular exciting winding concentric with said shaft and arranged for connection to a source of A.C. potential; annular magnetic yoke means concentric with said shaft and embracing said winding; a non-magnetic spacer secured to the inner end of said shaft to rotate with the latter; a magnetic material rotor secured to said non-magnetic spacer, said rotor including a circular body portion lying in a radial plane through said shaft and a plurality of pole teeth projecting from the periphery of said body portion at uniform angular spacings therearound; the number of said poles being an even multiple of the number of said pole teeth; said winding, when energized, producing an alternating magnetic field in an alternating magnetic flux path including said winding, said yoke means, said rotor and an air gap between the free ends of said pole teeth and said yoke means; said pole teeth extending in overlapping spaced relation to said permanent magnet poles to provide direct magnetic flux paths each including a respective north pole, a respective pole tooth, and a respective south pole angularly adjacent the respective north pole; said alternating and direct magnetic flux paths interlinking in said air gap; each pole tooth, upon de-energization of said winding, lying angularly intermediate a respective north pole and a respective south pole; all of said pole teeth, upon energization of said winding, being magnetized with the same instantaneous polarity whereby, upon such energization of said winding, all of said poles are attracted in the same angular direction toward the associated respective permanent magnet pole having the opposite polarity and repulsed in such same angular direction, by the associated respective pole having the same polarity.

2. A miniature synchronous electric motor, as claimed in claim 1, in which said magnetic yoke means includes an annular salient pole ring projecting into said air gap in aligned facing relation with said pole teeth.

3. A miniature synchronous electric motor, as claimed in claim 1, in which said pole teeth are tapered toward their free ends to provide pointed free ends thereon.

4. A miniature synchronous electric motor, as claimed in claim 3, in which said magnetic yoke means includes an annular salient pole ring extending into said air gap in aligned facing relation with the pointed ends of said pole teeth.

5. A miniature synchronous electric motor, as claimed in claim 4, in which said annular permanent magnet is a cylinder and said pole teeth extend in the same axial direction perpendicular to the plane of said rotor body portion and parallel to the cylindrical surface of said permanent magnet.

6. A miniature synchronous electric motor, as claimed in claim 4, in which said permanent magnet is a flat annular disk and said pole teeth extend in the same radial plane as said rotor body portion and parallel to a surface of said flat annular disk.

References Cited
UNITED STATES PATENTS 2,432,573  12/1947  Jorgensen _____ 310—164
3,149,256  9/1964  Kohlhagen _____ 310—156

MILTON O. HIRSHFIELD, *Primary Examiner.*

L. L. SMITH, *Assistant Examiner.*